Dec. 12, 1933.  V. W. MOODY  1,938,925
INSULATING UNIT
Filed May 5, 1932
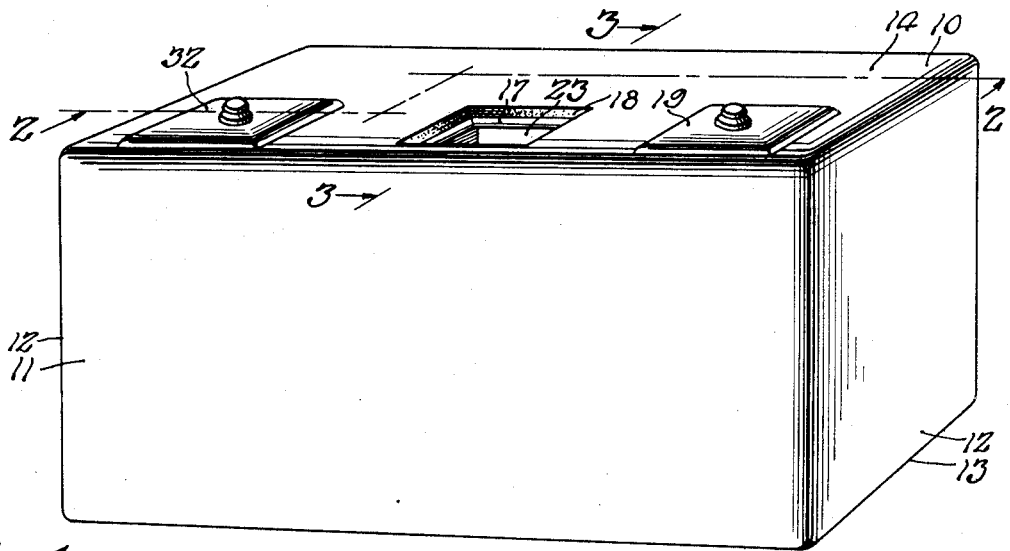
Fig. 1
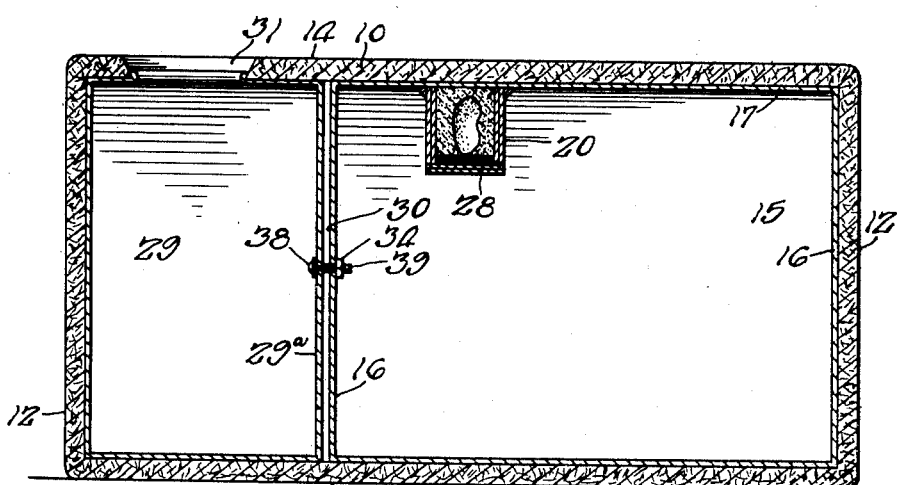
Fig. 2
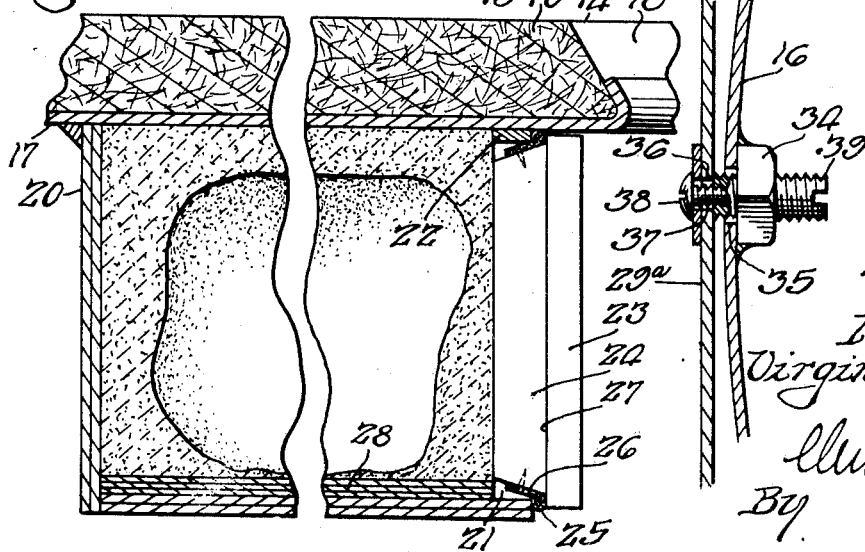
Fig. 3
Fig. 4
Inventor:
Virginius W. Moody Patented Dec. 12, 1933

1,938,925

UNITED STATES PATENT OFFICE 1,938,925

INSULATING UNIT

Virginius W. Moody, Long Branch, N. J., assignor to Reynolds Research Corporation, New York, N. Y., a corporation of Delaware Application May 5, 1932. Serial No. 609,343

3 Claims. (Cl. 62—91.5)

This invention relates to a cold storage unit and has to do more particularly with a unit incorporating a plurality of compartments each to have a different temperature.

It is an object of the present invention to provide a refrigerating unit having a directly cooled compartment, and a number of circumjacent compartments cooled by heat absorption of the first mentioned unit by media of the ambient material.

Another object of the present invention is to provide a refrigerating unit capable of absorbing heat indirectly from independent compartments, and having means for regulating reluctance to the flow of such heat.

Another object of the present invention is to provide in a refrigerating unit such as the above an accessible housing having walls of heat conducting material for enclosing a heat absorbing source and to physically connect a heat absorbing plate to said housing as a means of obtaining uniform refrigeration.

Still another object of the present invention is to provide a housing for inclosing a heat absorbing unit which is regulative of the heat transfer of said unit.

With the above objects and other desirable objects in view, the invention consists in certain novel features of construction and combinations and arrangements of parts, as will be hereinafter more fully set forth and pointed out in the appended claims.

The invention may be more fully understood from the following description and by a co-reference to the accompanying drawing wherein:

Figure 1 is a perspective view of one form of the invention and taken angular thereto and with a cover removed to show details;

Figure 2 is a cross section of the invention as taken along the line 2—2 of Figure 1;

Figure 3 is a fragmentary cross sectional view of the invention in elevation as indicated at the line 3—3 of Figure 1; and Figure 4 is a view taken transversely between two elements of the invention.

In the following description and in the drawing, like reference characters indicate similar parts.

Attention is first directed to Figure 1. Therein is shown a cabinet 10 having side walls 11, end walls 12, a bottom 13, and a top 14. These walls, top and bottom, are of a like insulating material and may be fabricated in any suitable manner.

In the right hand end of the cabinet 10 of dielectric material is a tank or compartment 15.

The walls 16 of the compartment are preferably of sheet metal. A heavy metal plate 17 serves as a top covering for the compartment 15. Communication with the interior of the compartment is had by means of suitable openings 18 having covers or doors 19.

Solidly fastened to the top plate 17 to depend into the compartment is a box 20. Any standard means of securing the box may be had as for instance, welding or soldering. If the plate 17 is employed as the top face of the box, an air tight joinder is had between the edges of the walls of the box and the plate. One side of the box 20 is omitted to provide an opening 21, conveniently disposed to one of openings 18 of the compartment. Within the opening 21 is placed a jam strip 22 utilizing the plate 17 as a means of support, the strip 22 being conterminate with the lateral dimension of the opening 21.

A closure of heat insulating material is provided for the opening 21 in the form of a lid 23. The lid 23 embodies a circumscribed beveled edge 24 which edge is contiguous to opening 21. Coextensive with the edge 24 is a gasket 25 having a lip 26, the latter being disposed inwardly of the box. A shoulder 27 formed at the edge of the bevel 24 serves as a platen for the gasket 25 when the gasket is brought against the edges of the box opening 21 and the jam 22 incident to seating the lid 23.

It is the purpose of the metal box 20 to house the refrigerant. The necessary pipes to accommodate expansion coils of a mechanical refrigeration system may be placed within the housing. When used, these pipes may be lead through the housing walls. The housing, on the other hand, may be filled with ice, or with solidified carbon dioxide. Although any of the above means of refrigeration are applicable to this invention, the preferred means is solidified carbon dioxide. The bottom of the housing 20 has upon its upper face layers of heat insulating material 28 upon which a block of carbon dioxide may be placed.

A block of carbon dioxide placed within the chamber 20 and upon the insulated floor 28 is efficaciously insulated from the chamber walls since the air circumfluent the refrigerant cake is an insulator. By removing or inserting a number of insulating laminations 28, the heat flow by way of the cold plate 17 by conduction through the walls of the box 20, and thence to the bottom of said box 20 to the refrigerant material may be regulated.

The closure 23, while it substantially impedes the radiation and conduction of heat into the refrigerant compartment 20, does not wholly prevent the escape of gas past the gasket 25. Thus the plate 17 and the side walls of the box 20 are an indirect means of cooling the storage compartment 15. Because of the extensive surface provided thereby, the plate 17 and box 20 afford a means for obtaining a uniform cooling effect. Also, the temperature of the compartment 15 is readily regulated by changing the number of insulating laminations 28 in the bottom of the chamber 20.

About the compartment 15 may be selectively disposed a number of similar compartments 29, but which contain no cooling element. Compartments 29 are cooled to desired higher temperatures than the compartment 15 by the retarded heat transfer through the air space between 29 and 15. The amount of the heat transferred from compartments 29 to compartment 20 depends upon the proximity of the wall of the compartments 29 to the compartment 15. The cabinet 10 fits snugly over all of the compartments to retain them in a fixed and desired assembly, and to effectively seal the air space 30 between the compartment 15 and the other compartments. The compartments 29 may be constructed of a sheet metal, and access thereto can be had to each by way of an opening 31 having a cover 32.

When it is desired to maintain a temperature within a tank 29 at a low degree, the tank wall is brought nearer the wall of tank 15, thereby lessening the space 30 and thus facilitating the heat transfer from the compartment 29 to compartment 15.

Figure 4 illustrates a method of interconnecting opposed compartment walls by a bolt and nut arrangement. The nut 34 is soldered or otherwise anchored to the inner side of the wall 16 with the threaded hole therein in registry with an aperture 35 within the wall 16. Alined with the aperture 35 is an aperture 36 in the wall 29a of an auxiliary compartment 29. A swivel member 37 is placed within the aperture 36 with the head 38 innermost and engages in a fixed manner the end of a screw plug 39 engaging the threads of the bolt 34. The member 37 then rotates with the plug 39, and as the plug is turned the nut 34 is advanced or retracted in accordance with the direction of turning of the plug. As the nut 34 is displaced to or from the wall 29a the two walls 16 and 29a are mutually deformed toward one another. Similarly when the nut is retracted the walls are forced back into the original position. Access to the plug 39 for its manipulation is had by way of an opening 18. In this manner the semi-diathermic space between the compartments is changed whereby the difference of temperature of the interconnected compartments is made to vary as desired.

The invention, as fully depicted in its preferred embodiment, affords a separate chamber from which, by simple means, a refrigerant therein may be stringently dissipated to maintain desired temperatures in a plurality of compartments affiliated therewith.

Having thus described my invention, what is claimed as new and desired to be secured by Letters Patent of the United States, is

1. An insulating unit comprising a refrigerant storage compartment, a chamber within said compartment and containing a refrigerating substance for cooling said compartment, a second storage compartment, there being a dead air space between said compartments, and means for adjusting the space relationship of the opposed walls of said compartments in said air space.

2. An insulating unit comprising a refrigerated storage compartment, a refrigerant chamber within said compartment and adapted to conduct heat from said compartment to the refrigerant therein, a second and independently enclosed storage compartment in opposed relationship to the first mentioned compartment, there being a dead air space between said compartments, and means for adjusting the breadth of said space between said compartments.

3. An insulating unit comprising a refrigerated storage compartment, a refrigerant chamber within said compartment and adapted to conduct heat from said compartment to the refrigerant therein, a second and independently enclosed storage compartment in opposed relationship to the first mentioned compartment, there being a dead air space between said compartments, and heat conducting means connected to the compartment walls forming opposed sides of said dead air space and adapted to adjust the space relationship of said walls.

VIRGINIUS W. MOODY.